United States Patent
Jochim et al.

(10) Patent No.: US 6,725,035 B2
(45) Date of Patent: *Apr. 20, 2004

(54) SIGNAL TRANSLATING REPEATER FOR ENABLING A TERRESTRIAL MOBILE SUBSCRIBER STATION TO BE OPERABLE IN A NON-TERRESTRIAL ENVIRONMENT

(75) Inventors: Kenneth J. Jochim, Boulder, CO (US); Jerry H. Polson, Longmont, CO (US)

(73) Assignee: Aircell Inc., Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/173,488

(22) Filed: Jun. 17, 2002

(65) Prior Publication Data

US 2003/0008652 A1 Jan. 9, 2003

Related U.S. Application Data (63) Continuation-in-part of application No. 09/686,923, filed on Oct. 11, 2000, which is a continuation-in-part of application No. 09/379,825, filed on Aug. 24, 1999, now Pat. No. 6,408,180, which is a continuation-in-part of application No. 08/027,333, filed on Mar. 8, 1993, now Pat. No. 5,444,762, and a continuation-in-part of application No. 07/847,920, filed on Mar. 6, 1992, now Pat. No. 5,557,656.

(51) Int. Cl.⁷ .................................................. H04Q 7/20
(52) U.S. Cl. .................. 455/431; 455/11.1; 455/67.11; 455/13.1
(58) Field of Search ................................ 455/11.1, 431, 455/67.11, 13.1, 552.1, 454, 67.16, 19, 12.1

(56) References Cited

U.S. PATENT DOCUMENTS 3,781,684 A * 12/1973 Inslerman .................. 455/11.1
4,019,181 A *  4/1977 Olsson et al. .............. 455/19
4,419,766 A * 12/1983 Goeken et al. ............. 455/431
4,970,510 A * 11/1990 Stelling .................... 455/67.11
5,067,172 A * 11/1991 Schloemer ................. 455/431
5,276,908 A *  1/1994 Koohgoli et al. ........... 455/454
5,367,304 A * 11/1994 Jan et al. ................... 455/13.1
5,455,964 A * 10/1995 Roos et al. ................. 455/522
5,519,761 A    5/1996 Gilhousen (List continued on next page.)

FOREIGN PATENT DOCUMENTS

GB      2227393 A  *  7/1990  ............ H04Q/7/04
WO      WO 00/76087 A1  12/2000

OTHER PUBLICATIONS

Casewell, I.E. The provision of GSM cellular radio environments within passenger aircraft operating over Europe, Dec. 14, 1989, pp. 172–176.*

Primary Examiner—Edward F. Urban
Assistant Examiner—Lana Le
(74) Attorney, Agent, or Firm—Patton Boggs LLP (57) ABSTRACT

The signal translating repeater is located in the aircraft and enables a traditional ground-based mobile subscriber station to provide wireless telecommunication services to a subscriber in both the terrestrial (ground-based) and non-terrestrial regions. The signal translating repeater receives frequency translated cell site cellular signals, comprising cellular radio frequency communication signals from a cell site that are in a mode compatible with ground-based cellular communications but shifted in frequency from the standard ground-based cellular radio frequency communication signals to other radio frequencies that are allocated for non-terrestrial cellular communications. The signal translating repeater automatically translates the received frequency translated cell site cellular signals into the ground-based cellular signals, comprising radio frequency communication signals that are in a mode compatible with ground-based cellular communications, used by the ground-based mobile subscriber stations located in the aircraft.

28 Claims, 5 Drawing Sheets

U.S. PATENT DOCUMENTS

| | | | | |
|---|---|---|---|---|
| 5,535,430 A | * | 7/1996 | Aoki et al. | 455/552.1 |
| 5,559,865 A | | 9/1996 | Gilhousen | |
| 5,878,034 A | * | 3/1999 | Hershey et al. | 455/67.16 |
| 5,926,758 A | * | 7/1999 | Grybos et al. | 455/13.1 |
| 6,324,405 B1 | * | 11/2001 | Young et al. | 455/12.1 |
| 6,408,180 B1 | * | 6/2002 | McKenna et al. | 455/431 |
| 2002/0045444 A1 | * | 4/2002 | Usher et al. | 455/422 |
| 2002/0123344 A1 | * | 9/2002 | Criqui et al. | 455/431 |

* cited by examiner

SIGNAL TRANSLATING REPEATER FOR ENABLING A TERRESTRIAL MOBILE SUBSCRIBER STATION TO BE OPERABLE IN A NON-TERRESTRIAL ENVIRONMENT

CROSS-REFERENCE TO RELATED APPLICATIONS

This application is related to U.S. patent application Ser. No. 10/152,870, titled "Signal Translating Repeater for Enabling a Terrestrial Mobile Subscriber Station to be Operable in a Non-Terrestrial Environment", and is a continuation-in-part of U.S. patent application Ser. No. 09/686,923 filed Oct. 11, 2000 titled "Aircraft-Based Network For Wireless Subscriber Stations", which is a continuation-in-part of U.S. patent application Ser. No. 09/379,825 filed Aug. 24, 1999 now U.S. Pat. No. 6,408,180 titled "Ubiquitous Subscriber Station", which is a continuation-in-part of Ser. No. 08/027,333 filed Mar. 8, 1993 is now U.S. Pat. No. 5,444,762, titled "Method and Apparatus for Reducing Interference Among Cellular Telephone Signals" and Ser. No. 07/847,920 filed Mar. 6, 1992 is now U.S. Pat. No. 5,557,656, titled "Mobile Telecommunications".

FIELD OF THE INVENTION

This invention relates to cellular communications and, in particular, to a signal translating repeater that enables a terrestrial (ground-based) mobile subscriber station to provide wireless telecommunication services in both the terrestrial (ground-based) and non-terrestrial regions.

PROBLEM

It is a problem in the field of cellular mobile telecommunication services to provide customers with high quality communication services in a unified manner via a wireless communication medium. Existing cellular mobile telecommunication systems serve terrestrial (termed ground-based herein) mobile subscriber stations, but this service was traditionally not extensible to non-terrestrial mobile subscriber stations due to signal interference problems between ground-based and non-terrestrial mobile subscriber stations. The above-noted U.S. Patents disclose a non-terrestrial mobile telecommunication system and a mobile subscriber station operable in such a system, which provides subscribers with cellular mobile telecommunication services in the non-terrestrial region. However, the mobile subscriber stations used in the ground-based cellular mobile telecommunication system and the mobile subscriber stations used in the non-terrestrial cellular mobile telecommunication system are traditionally architected to operate in only their associated cellular mobile telecommunication system.

Thus, the existing mobile subscriber stations are incapable of being used both in ground-based cellular mobile telecommunication systems and non-terrestrial cellular mobile telecommunication systems. Therefore, subscribers must presently use one mobile subscriber station for the ground-based cellular mobile telecommunication system and another mobile subscriber station for the non-terrestrial cellular mobile telecommunication system. Each of these mobile subscriber stations has an assigned telephone number and the communication services provided to the subscriber are therefore disjunction.

The mobile subscriber station described in the above-noted U.S. patent application Ser. No.: 09/379,825, titled Ubiquitous Subscriber Station, provides wireless telecommunication services in both the terrestrial (ground-based) and non-terrestrial regions. This unique mobile subscriber station enables the subscriber to receive wireless cellular mobile telecommunication services in a unified manner in both the terrestrial (ground-based) and non-terrestrial regions.

However, for subscribers equipped with a traditional ground-based mobile subscriber station, there is no provision for receiving cellular communication services in an aircraft.

SOLUTION

The above described problems are solved and a technical advance achieved in the field by the signal translating repeater, located in the aircraft, that enables a traditional ground-based mobile subscriber station to provide wireless telecommunication services to a subscriber in both the terrestrial (ground-based) and non-terrestrial regions. The signal translating repeater achieves this by extending the usage of existing ground-based cellular communications to non-terrestrial cellular communications in a manner that avoids the possibility of signal interference between the ground-based mobile subscriber stations and ground-based mobile subscriber stations located in a non-terrestrial location.

In particular, the signal translating repeater is located in the aircraft and receives frequency translated cell site cellular signals, comprising cellular radio frequency communication signals from a cell site that are in a mode compatible with ground-based cellular communications but shifted in frequency from the standard ground-based cellular radio frequency communication signals to other radio frequencies that are allocated for non-terrestrial cellular communications.

The signal translating repeater automatically translates the received frequency translated cell site cellular signals from the radio frequencies that are allocated for non-terrestrial cellular communications into the ground-based cellular signals, comprising radio frequency communication signals that are in a mode compatible with ground-based cellular communications, used by the ground-based mobile subscriber stations located in the aircraft. The subscriber therefore can use their ground-based mobile subscriber station in all locations for uninterrupted wireless communications services, either using one telephone number for all locations, or by having a telephone number that is assigned for ground-based wireless communications services and another telephone number that is assigned for non-terrestrial wireless communications services to assist in the direction of the call completion.

The existing ground-based cell site transmitter/receiver antenna installations can be used to serve non-terrestrial mobile subscriber stations by the addition of non-terrestrial antenna elements and the operation of the non-terrestrial transmitters and receivers at radio frequencies that are not used for ground-based cellular communications. In this manner, non-terrestrial cells can be created in the region of space adjacent to and overlying the existing ground-based cells without the possibility of interaction between the existing ground-based cellular mobile telecommunication system and the non-terrestrial mobile subscriber stations. To the mobile telecommunication switching office, the non-terrestrial cells all operate in harmony with the existing ground-based cell sites with no discernible differentiation among cells or stations, whether ground-based or non-terrestrial in nature. A further optional solution to the interference problem is the manipulation of the control channels in the frequency translated cell site cellular signals such that the cellular signals transmitted between the signal translating repeater in the aircraft and the cell site cannot cause either a ground-based cell site receiver or ground-based mobile subscriber station receiver to receive and interpret these control signals. The designation of a set of control channels within the plurality of available voice channels in the cellular channel space represents the method of bifurcating the volume of space into two disjunct regions: ground-based and non-terrestrial.

DETAILED DESCRIPTION

Cellular mobile telecommunication systems provide the service of connecting mobile telecommunication customers, each having a mobile subscriber station, to both land-based customers who are served by the common carrier public telephone network as well as other mobile telecommunication customers. In such a system, all incoming and outgoing calls are routed through mobile telecommunication switching offices (MTSO), each of which is connected to a plurality of cell sites (base stations) which communicate with mobile subscriber stations located in the area covered by the cell sites. The mobile subscriber stations are served by the cell sites, each of which is located in one cell area of a larger service region. Each cell site in the service region is connected by a group of communication links to the mobile telecommunication switching office. Each cell site contains a group of radio transmitters and receivers with each transmitter-receiver pair being connected to one communication link. Each transmitter-receiver pair operates on a pair of radio frequencies: one frequency to transmit radio signals to the mobile subscriber station and the other frequency to receive radio signals from the mobile subscriber station.

The first stage of a cellular communication connection is set up when a transmitter-receiver pair in a cell site, operating on a predetermined pair of radio frequencies, is turned on and a mobile subscriber station, located in the cell site, is tuned to the same pair of radio frequencies. The second stage of the communication connection is between the communication link connected to this transmitter-receiver pair and the common carrier public telephone network. This second stage of the communication connection is set up in the mobile telecommunication switching office, which is connected to the common carrier public telephone network by incoming and outgoing trunks. The mobile telecommunication switching office contains a switching network to switch mobile customer voice and/or data signals from the communication link to an incoming or outgoing trunk. The mobile telecommunication system is controlled by a mobile telecommunication controller at the mobile telecommunication switching office and a cell site controller at each cell site associated with the mobile telecommunication switching office. A plurality of data links connect the mobile telecommunication controller and the associated cell site controllers. The mobile telecommunication controller operates under control of complex software and controls the switching network. The mobile telecommunication controller also controls the actions of the associated cell site controllers by generating and interpreting the control messages that are exchanged with the associated cell site controllers over the data links. The cell site controllers at each cell site, in response to control messages from the mobile telephone switching office, control the transmitter-receiver pairs at the cell site. The control processes at each cell site also control the tuning of the mobile subscriber stations to the selected radio frequencies.

Each cell in the ground-based cellular mobile telecommunication network comprises a predetermined volume of space radially arranged around the cell site transmitting antenna with the region of space typically approximating a cylindrical volume or a portion of a cylindrical volume having limited height. Since all of the mobile subscriber stations are installed in ground-based units (such as motor vehicles or handheld units) in traditional cellular mobile telecommunication systems, the antenna radiation pattern of the cell site is aligned to be proximate to the ground and the polarization of the signals produced by the cell site antenna is vertical in nature. In order to prevent the radio signals in one cell site from interfering with radio signals in an adjacent cell site, the transmitter frequencies for adjacent cell sites are selected to be different so that there is sufficient frequency separation between adjacent transmitter frequencies to avoid overlapping transmissions among adjacent cell sites. In order to reuse the same frequencies, the cellular telecommunication industry has developed a small but finite number of transmitter frequencies and a cell site allocation pattern that ensures that two adjacent cell sites do not operate on the same frequency. When a ground-based mobile subscriber station initiates a call connection, control signals from the local cell site transmitter cause the frequency agile transponder in the ground-based mobile subscriber station to operate at the frequency of operation designated for that particular cell site. As the ground-based mobile subscriber station moves from one cell site to another, the call connection is handed off to the successive cell sites and the frequency agile transponder in the ground-based mobile subscriber station adjusts its frequency of operation to correspond to the frequency of operation of the transmitter located in the cell site in which the ground-based mobile subscriber station is presently operational.

There are numerous technologies that can be used to implement the cellular mobile telecommunication system and these include both digital and analog paradigms, with the digital apparatus representing the more recent of the two technologies. Furthermore, the frequency spectrum is allocated for different cellular communication systems, with the personal communication system (PCS) systems being located in the 1.9 GHz region of the spectrum while traditional cellular systems are located in the 800 MHZ region of the spectrum. The access methods used in cellular communication systems include Code Division Multiple Access that uses orthogonal codes to implement communication channels, Time Division Multiple Access which uses time division multiplexing of a frequency to implement communication channels and Frequency Division Multiple Access which uses separate frequencies to implement communication channels, as well as combinations of these technologies. These concepts are well known in the field of cellular communications and various ones of these can be used to implement the signal translating repeater of the present invention. These technologies are not limitations to the signal translating repeater which is described herein, since a novel system concept is disclosed, not a specific technologically limited implementation of an existing system concept.

This existing cellular mobile telecommunication system is presently in widespread use and has been designed to eliminate the problem of frequency overlap among adjacent cell sites and to minimize the number of frequencies required to serve vast areas without encountering the possibility of frequency overlap. These existing cellular mobile telecommunication systems, however, are inoperable when the user's mobile subscriber station is non-terrestrial in nature. In particular, the provision of cellular mobile telecommunication services to aircraft is inconsistent with the architecture of the existing ground-based cellular mobile telecommunication network since the antenna pattern of the existing ground-based cellular mobile telecommunication system broadcasts a signal in a pattern proximate to the ground and the pattern of frequency allocation for the pattern of cell sites is not extensible to aircraft. In particular, an antenna pattern that would be capable of serving a fast moving aircraft would have to cover a sufficient volume of space to minimize the number of station hand off's as the aircraft traverses one cell site after another. For the non-terrestrial mobile subscriber station to have an adequate sized cell site, that cell site would span a large number of the existing ground-based cell sites. Therefore, the existing pattern of frequency reuse would be disrupted and there presently is no frequency allocated or available for allocation to such purpose. Existing cellular mobile telecommunication systems serve terrestrial (termed ground-based herein) mobile subscriber stations, but this service is not presently extensible to non-terrestrial mobile subscriber stations due to signal interference problems between ground-based and non-terrestrial mobile subscriber stations.

The multi-dimensional cellular mobile telecommunication system noted above extends the usage of ground-based cellular communications to ground-based mobile subscriber stations that are located in an aircraft (non-terrestrial mobile subscriber stations) in a manner that avoids the possibility of signal interference between the ground-based and non-terrestrial mobile subscriber stations. The multi-dimensional cellular mobile telecommunication system adds an overlay of non-terrestrial cells of predetermined geometry and locus in space to the existing ground-based cellular mobile telecommunication network.

Multi-Dimensional Cellular Mobile Telecommunication Network Architecture

Figure 1:
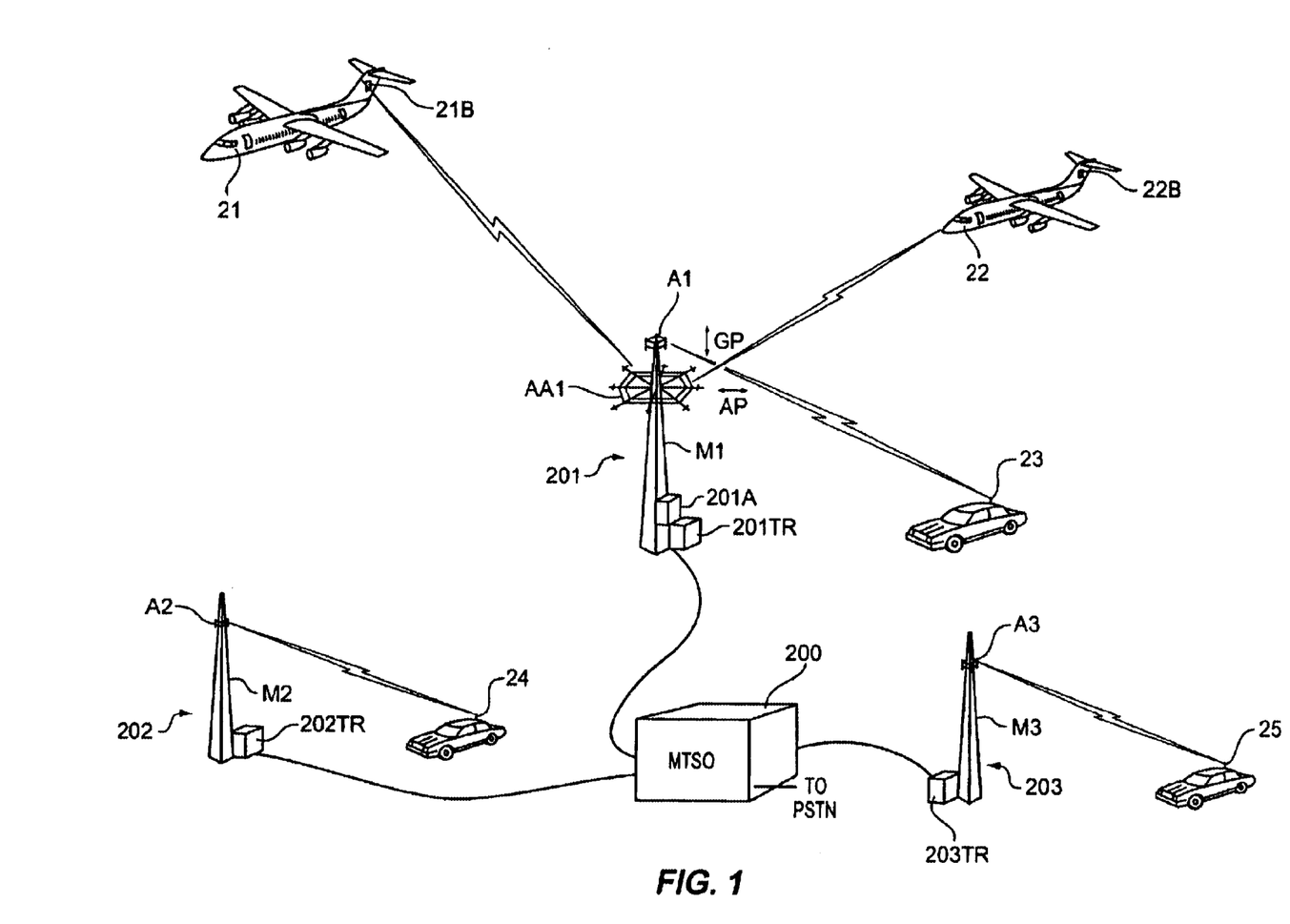
FIG. 1 illustrates, in block diagram form, the overall architecture of a multi-dimensional cellular mobile telecommunication network.

FIG. 1 illustrates, in block diagram form, the overall architecture of a multi-dimensional cellular mobile telecommunication network. This diagram illustrates the basic concepts of the multi-dimensional cellular mobile telecommunication network and, for the purpose of simplicity of illustration, does not comprise all of the elements found in a typical network. The fundamental elements disclosed in FIG. 1 provide a teaching of the interrelationship of the various elements which are used to implement a multi-dimensional cellular mobile telecommunication network.

The terms "cell site" and "cell" are sometimes loosely used in the literature, and the term "cell site" generally denotes the locus at which the transmitter and receiver apparatus is located, while the term "cell" generally denotes the region of space which is served by a particular transmitter-receiver pair which is installed at a cell site. The particular technology used to implement the communications between subscriber stations and the transmitter-receiver pairs as well as the nature of the data transferred there between, be it voice, video, telemetry, computer data, and the like, are not limitations to the system which is described herein, since a novel system concept is disclosed, not a specific technologically limited implementation of an existing system concept. Therefore, the term "cellular" as it is used herein denotes a communication system which operates on the basis of dividing space into a plurality of volumetric sections or cells, and managing communications between subscriber stations located in the cells and the associated transmitter-receiver pairs located at the cell site for each of these cells.

The cellular radio telecommunication service provided in North America, for example, is designed primarily for motor vehicles and other ground-based mobile subscriber stations. The system presently in use uses a plurality of radio frequency channels in the Ultra-High Frequency (UHF) band with each channel in this system comprising a pair of UHF frequencies in the designated band. One frequency in the channel is termed the "forward" carrier and is used for transmissions from the base station to the mobile subscriber station, while the other frequency in the pair is termed the "reverse" carrier and is used for transmissions from the mobile subscriber station to the base station. Present technologies in use include analog Frequency Modulation (FM) as the method for transmitting the signal with a 30 kHz frequency channel spacing. There is also digital transmission capability in some systems, wherein a plurality of signals are multiplexed on to the same carrier, with the 30 kHz spacing between adjacent bands (TDMA) or the code space is divided into multiple channels (CDMA). A total of 832 such channels are available for cellular telephone use, and these channels are located between the frequencies of 824 MHZ to 849 MHZ, and, 869 MHZ to 894 MHZ. The transmitter has 832 communication channels, 790 voice/data communication and 42 control channels. This set of channels is divided into two subsets, each consisting of 21 control channels and an associated 395 voice/data channels. A first set of channels is typically termed the "A" side of the band and the remaining set of channels is typically termed the "B" side of the band. The 416 radio channels in each set of channels are divided into 21 control channels and 395 voice/data communication channels. The 395 voice/data communication channels can be subdivided into a predetermined number of groups, with a typical selection being seven groups of approximately 56 channels in a seven cell channel reuse plan, termed a K=7 plan.

The basic ground-based cellular telecommunication network of the prior art is incorporated into this system to enable the non-terrestrial mobile subscriber stations to be integrated into the existing service structure. In particular, the mobile telecommunication switching office 200 serves to interconnect a plurality of ground-based cells 201, 202, 203 with the public switched telephone network (PSTN), as noted above. The ground-based cells 201, 202, 203 each include a transmitter-receiver pair 201TR, 202TR, 203TR and an antenna complex, which typically comprises a tower M1, M2, M3 to which is affixed one or more antenna elements A1, A2, A3, respectively.

Existing cellular mobile telecommunication systems use both directional and non-directional antenna elements to implement the desired antenna characteristic pattern. Directional antenna, as the term is used herein, does not imply that a signal is transmitted or received from a particular direction, but that the antenna has a non-isotropic radiation pattern. A directional antenna, or a plurality of directional antenna elements, is preferably used on the ground-based cellular base station to increase signal separation. The antenna structure used in ground-based mobile cellular telecommunications is such that signals emanating from the cell site transmitter antenna elements of antennas A1, A2, A3, propagate in a substantially radial direction from the antenna in all directions with the top of the antenna pattern being substantially coplanar with the Earth's surface and at a level that corresponds to the elevation of the transmitter antenna above the Earth's surface. The receiver antenna has characteristics that are analogous to that of the transmitter antenna.

The multi-dimensional cellular mobile telecommunication network adds to the existing mobile cellular telecommunication network one or more non-terrestrial cells. A non-terrestrial cell is defined as an installation which is equipped with at least one non-terrestrial cell site transmitter-receiver pair, such as 201A that operates on radio frequencies that are different than those used for the ground-based transmitter-receiver pairs 201TR, 202TR, 203TR. The non-terrestrial cell site includes an associated antenna AA1 for receiving and transmitting cellular telecommunication transmissions to and from non-terrestrial mobile subscriber stations, such as those located in aircraft 21, 22, which are equipped with the signal translating repeater. The non-terrestrial transmitter-receiver pair 201A is interconnected to the public switched telephone network PSTN via the mobile telecommunication switching office MTSO. The non-terrestrial cell site antenna AA1 has a radio signal radiation pattern which is directed above a horizontal plane encompassing the antenna. The majority of the radiated radio signal is directed at angles above the horizontal plane, which angles are typically in the range of $1.5°$ to $4°$ in magnitude, to avoid interference with ground-based mobile cellular telephone stations 23, 24, 25. The multi-path effect is also minimized since the energy level of the signals impinging on the reflective earth surface is reduced.

The non-terrestrial cell site transmitter-receiver pair 201A can be integrated with an existing ground-based cell site transmitter-receiver pair, in that there is some sharing of equipment which mounts the antenna elements on a common tower M1 and/or interconnects both cell site transmitter-receiver pairs to the public switched telephone network PSTN. In the embodiment of FIG. 1, the non-terrestrial cell site antenna elements AA1 are mounted on the same tower M1 as the antenna elements A1 used to implement the ground-based cell site. The non-terrestrial cell site antenna elements AA1 are typically mounted below the existing antenna elements A1 used to implement (or reserved for) the ground-based cell site, which also reduces the ground footprint, thus reducing the Service Area Boundary as it exists for a ground-based mobile.

Figure 2:
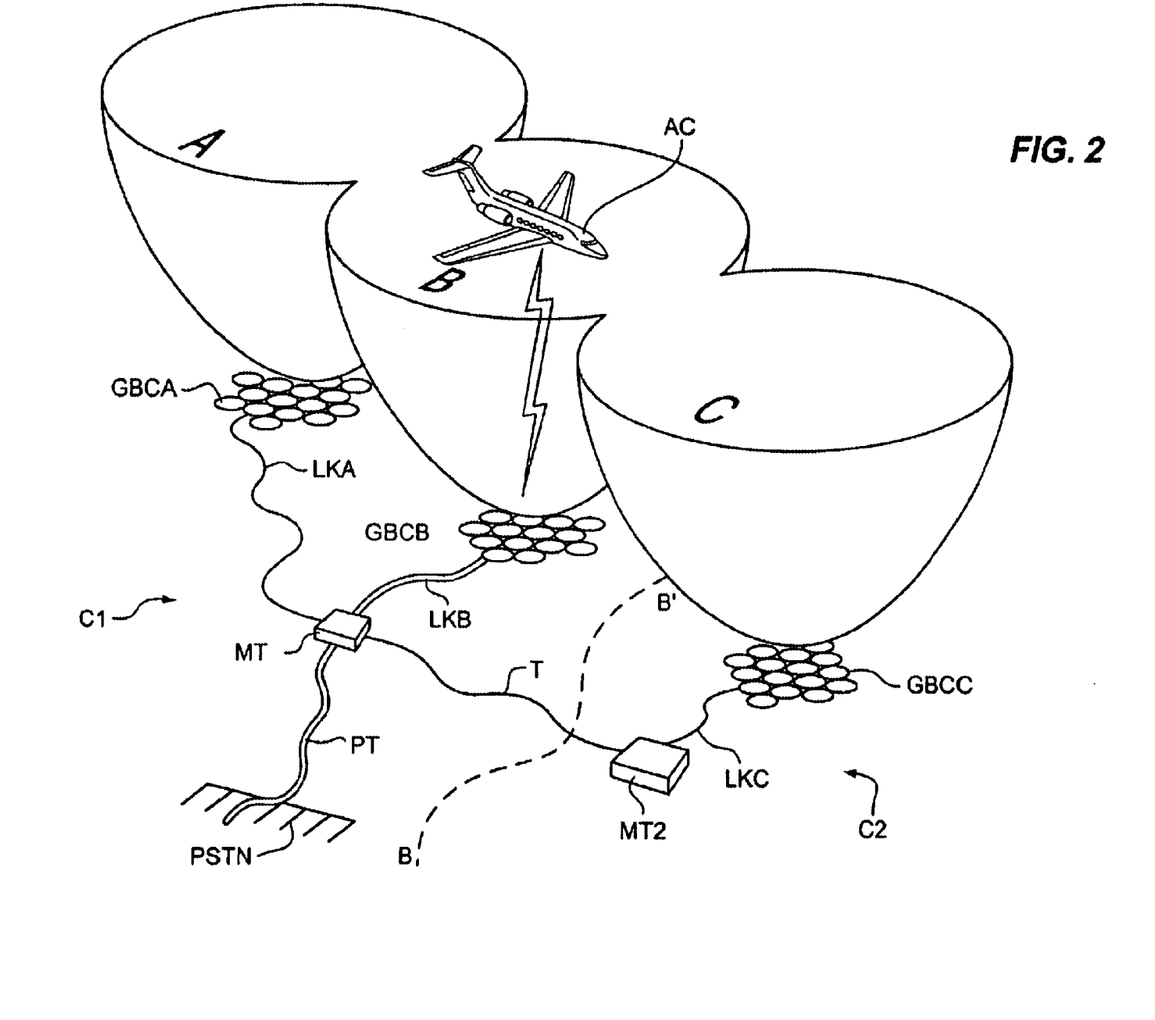
FIG. 2 illustrates, in block diagram form, additional details of the architecture of the non-terrestrial component of the multi-dimensional cellular telecommunication network.

FIG. 2 illustrates in block diagram view, additional details of the architecture of the non-terrestrial component of the multi-dimensional cellular telecommunication network where the non-terrestrial mobile subscriber station comprises an aircraft AC which is located in non-terrestrial cell B, which non-terrestrial cell overlays a plurality of ground-based cells GBCB. Two additional non-terrestrial cells A, C are also shown, each of which overlays another plurality of ground-based cells GBCA, GBCC, respectively. The three non-terrestrial cells A–C are shown as being oriented adjacent to each other, with cell B being located between non-terrestrial cells A and C. It is typical that other non-terrestrial cells would be implemented adjacent to non-terrestrial cells A–C to provide complete coverage of the non-terrestrial space that extends above the ground. For simplicity of description, only three non-terrestrial cells A–C are shown in FIG. 2. The existing ground-based cells are each connected via trunks LKA-LKC to an associated mobile telecommunication switching office MT1, MT2, which are themselves connected together via trunk T and to public switched telephone network PSTN via trunks PT. In this environment, it is typical that two different providers are serving the network, with a first company serving region C1 and a second company serving region C2, with the dividing line between the two service areas being shown in the figures by the dashed line B–B'. In this system environment, a call is established from a subscriber located in the aircraft AC, using a mobile subscriber station apparatus located in the aircraft AC in the well-known manner of the existing ground-based cellular systems. The control signals from the mobile subscriber station apparatus located in the aircraft AC are transmitted to the cell site transmitter-receiver pair of non-terrestrial cell B, which is served by the first cellular company which provides service in region C1. The call is connected via trunk LKB to the mobile telecommunication switching office MT1, which interconnects the call connection to the public switched telephone network PSTN via trunk PT, in well-known fashion. The call connection is then extended to the designated subscriber (not shown) which is assumed for this description to be located at a "land line" station. The allocation of frequencies and the subscriber identification for aircraft AC is managed via the non-terrestrial cell site control software which operates independent of the ground-based cellular network and which can be operational in the mobile telecommunication switching office MT1 which serves the non-terrestrial cell site for non-terrestrial cell B.

Multi-Dimensional Cellular System Channel Interference Elimination

A particular problem is encountered when attempting to use cellular mobile telephone equipment from a non-terrestrial location, such as an aircraft. The elevated position of the mobile cellular telephone station when located aboard an aircraft causes the signal to be broadcast over a wide area of the surface of the earth, where it is received by many ground-based cell site transmitter-receiver pairs. In addition, the signal strength at a plurality of these ground-based cell site transmitter-receiver pairs may be substantially equal, making determination of the controlling base station a difficult choice. Thus, mobile cellular subscriber stations are typically prohibited by governmental regulatory agencies from transmitting from aircraft. The cellular telephone network requires a minimum signal-to-noise ratio to enable the communications to be of an acceptable quality. The presently required separation for analog AMPS service between signal power level and the background or noise power level can be as low as 6 dB (with 8–10 dB being typical) for the non-terrestrial subscriber station. In contrast, the ground-based mobile required separation is 17 dB for both the mobile subscriber station and the cell-site receiver for interference free communications. Thus, the non-terrestrial cellular communication portion of the multidimensional system must provide adequate signal strength by the appropriate selection and sitting of antenna elements within the constraints of available signal power. In addition, the interference between ground-based and non-terrestrial mobile subscriber stations must be obviated by the signal characteristics as well as communication control philosophy.

The avoidance of interference between the ground-based cellular communications and the non-terrestrial cellular communications can be addressed by modulating the cellular signals, comprising the set of channels as are used in ground-based cellular communications, using a carrier frequency that is outside of the range of frequencies that are used for ground-based cellular communications. The resultant cellular communication signals are not usable by ground-based mobile subscriber stations without translation back to the carrier frequency of the ground-based cellular communications.

Figure 4:
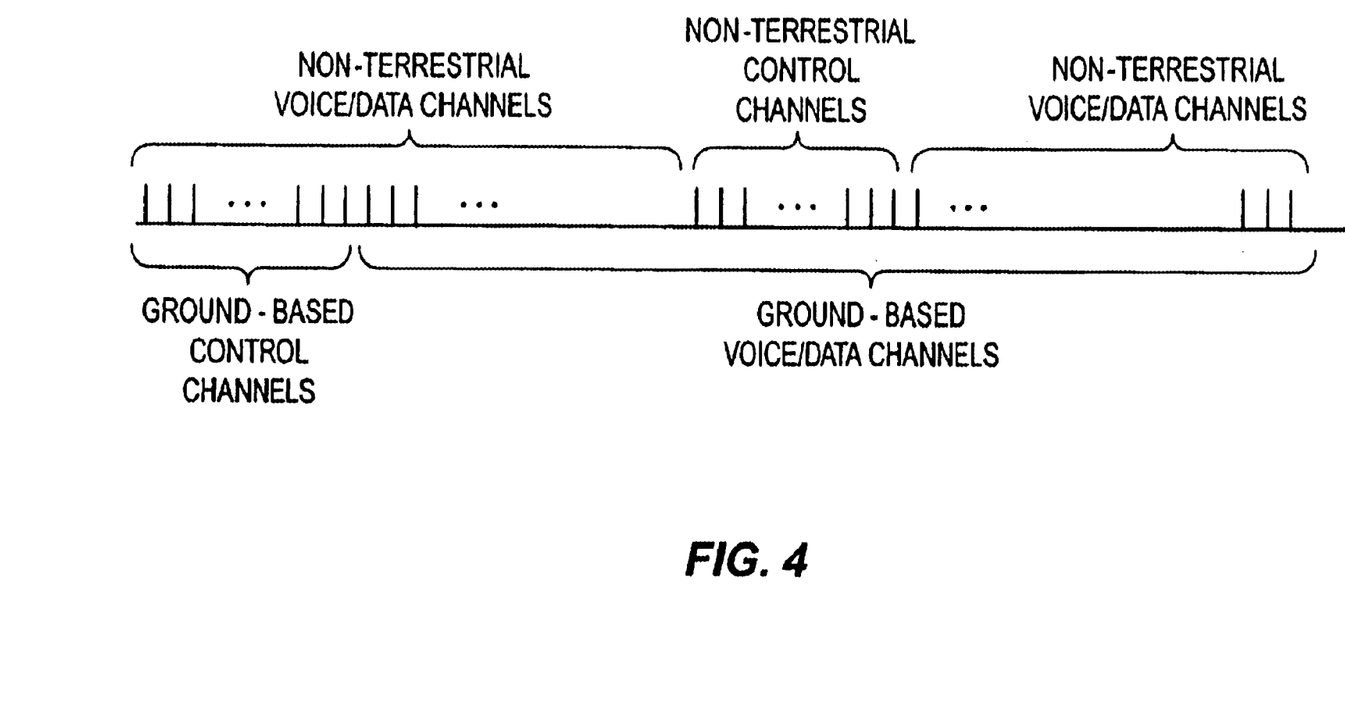
FIG. 4 illustrates the non-terrestrial cellular frequency allocation for a typical cell.

The optional communication control philosophy portion of this unique solution comprises a manipulation of the control channels such that control signals originated by a non-terrestrial mobile subscriber station cannot cause either a ground-based cell site receiver or ground-based mobile subscriber station receiver to receive and interpret these control signals. The designation of control channels within the plurality of available channels represents the method of bifurcating the volume of space into two disjunct regions: ground-based and non-terrestrial. As shown in FIG. 4, the control channels dedicated for use in non-terrestrial cellular communications are those which are designated as voice/data communication channels for the ground-based cellular communications. Thus, each ground-based cell site transceiver communicates with the ground-based mobile subscriber stations extant in its cell on predetermined control channels, which control channels are ignored by non-terrestrial mobile subscriber stations, since these channels are not control channels in the view of the non-terrestrial mobile subscriber stations. Similarly, each non-terrestrial cell site transmitter-receiver pair communicates with the non-terrestrial mobile subscriber stations extant in its cell on predetermined control channels, which control channels are ignored by ground-based mobile subscriber stations, since these channels are not control channels in the view of the ground-based mobile subscriber stations. Thus, the allocation of control channels in the non-terrestrial cells represents a paradigm shift with respect to the adjacent ground-based cells. This philosophy can be implemented in a cost effective manner, since the large installed base of ground-based mobile subscriber stations and ground-based cell site transmitter-receiver pairs inherently reject control signals transmitted outside of the control channels, such as in the voice/data communication channels. It is only the newly constructed non-terrestrial mobile subscriber stations and their associated cell site transmitter-receiver pairs which must be modified to reassign control channels. This implementation incurs a relatively small cost.

Signal Translating Repeater

Figure 5:
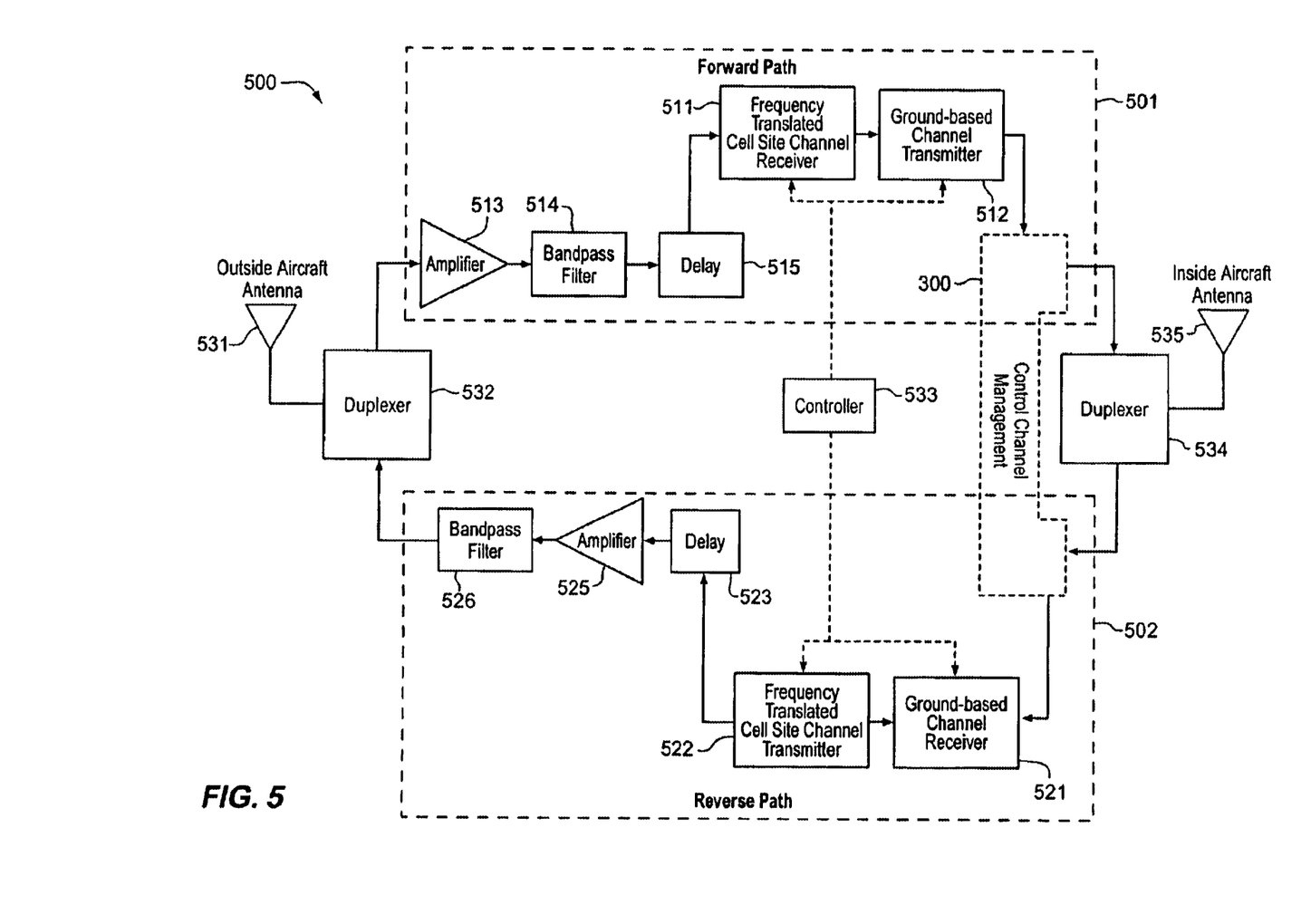
FIG. 5 illustrates, in block diagram form, the architecture of an alternative typical embodiment of the signal translating repeater of the present invention.

FIG. 5 illustrates, in block diagram form, the architecture of an embodiment of the signal translating repeater 500 of the present invention. The present signal translating repeater 500 is located in an aircraft and provides service to ground-based mobile subscriber stations that are located in the aircraft, using the ground-based cellular communication paradigm. The present signal translating repeater 500 converts between these ground-based cellular communication signals and the frequency translated cell site cellular communication signals. The frequency translated cell site cellular communication signals are exchanged with non-terrestrial cell site(s) presently serving the aircraft. In this system, all ground-based mobile subscriber stations appear as roamers to the non-terrestrial base stations.

As illustrated in FIG. 5, the present signal translating repeater 500 is a device that is a combination of a signal repeater and a frequency translator. The non-terrestrial cell sites transmit frequency translated cell site cellular signals to the aircraft. The signal translating repeater 500, located on board the aircraft, captures the transmitted forward path signals via a standard antenna located on the exterior of the aircraft and rebroadcasts these forward path signals in the aircraft to the subscribers' ground-based mobile subscriber stations via an in-cabin antenna system. The rebroadcast signals comprise frequency translated signals using standard forward path channels. The signal translating repeater 500 receives standard ground-based reverse path signals the ground-based mobile subscriber stations located on the aircraft and retransmits these reverse path signals to the non-terrestrial cell site via frequency translated cell site cellular communications signals.

The present signal translating repeater 500 can also function to preclude operation of any 800 MHz digital cellular mobile subscriber station in any of a number of modes. One such method is to delay the retransmission of the forward voice channel by a sufficient delay provided by delay units 515, 523 such that the round trip time from a non-terrestrial base station to the ground-based mobile subscriber station in the aircraft and back to the non-terrestrial base station exceeds the allowable delay time compensation in the ground-based mobile subscriber station. This time delay value is typically the equivalent to a round trip of >40 miles and consists of a time delay of approximately 500 microseconds or more. Thus, in this application, any CDMA, TDMA or GSM ground-based mobile subscriber station is unable to connect to an inadvertent ground cellular transmission, even if it were detectable in the aircraft.

A typical implementation of the signal translating repeater 500 is illustrated in FIG. 5. This device consists of an antenna 531, typically mounted on the outside of the aircraft, which is connected to a duplexer 532, which interconnects the non-terrestrial antenna 531 to a Forward Path Frequency Translation Circuit 501 and a Reverse Path Frequency Translation Circuit 502. Likewise, an antenna 535 is located inside the aircraft and is itself connected to the Forward Path Frequency Translation Circuit 501 and the Reverse Path Frequency Translation Circuit 502 via a duplexer 534.

The Forward Path Frequency Translation Circuit 501 consists of a frequency translated cell site cellular communications receiver 511, which is connected to a corresponding ground-based transmitter 512. The receiver and transmitter are connected to and controlled by the signal translating repeater controller 533. The non-terrestrial cell sites transmit signals on ground-based cellular communication channels to the aircraft, but on radio frequencies that are translated from those used by conventional ground-based cellular communication systems. The frequency translated cell site cellular signals in the forward direction are received by the non-terrestrial antenna 531, fed through the duplexer 532 to amplifier 513, band pass filter 514 and delay 515 to condition the received frequency translated cell site cellular communications signals, which are then passed to frequency translated cell site channel receiver 511. The signals are processed by the frequency translated cell site channel receiver 511 to demodulate the cellular channels from the carrier signal. The ground-based channel transmitter 512 modulates these excerpted channel signals, that were contained in the received frequency translated cell site cellular signals, into the radio frequencies used by the ground-based cellular communication channels. The received frequency translated cell site cellular signals are processed by these elements to excerpt the channel content and frequency translate the channel signals to different associated channels. Thus, the signals carried by the frequency translated cell site cellular communication channels are translated into the ground-based cellular communication channels.

The Reverse Path Frequency Translation Circuit 502 consists of ground-based channel receivers 521 which are connected to a frequency translated cell site channel transmitter 522. This receiver and transmitter are connected to and controlled by the signal translating repeater controller 533. The ground-based mobile subscriber stations located in the aircraft transmit signals on ground-based cellular communication channels in the aircraft pursuant to the normal operation of the ground-based cellular communication system. The ground-based cellular signals in the reverse direction are received by the antenna 535 and passed to the ground-based channel receivers 521 and the frequency translated cell site channel transmitter 522 where the channels contained in the received ground-based cellular communications are translated into the frequency translated cell site cellular communications channels. The received ground-based cellular communication channels are processed by these elements to excerpt the channel content and frequency translate the channel signals to different associated channels. Thus, the signals carried by the ground-based cellular communication channels are translated into the frequency translated cell site cellular communications channels. These signals inserted into the frequency translated cell site cellular communications channels are delayed by delay element 523, amplified by amplifier 525 and processed through band-pass filter 526 to duplexer 532 and antenna 531 for transmission to the non-terrestrial cell site.

Signal Translating Repeater with Control Channel Management

Figure 3:
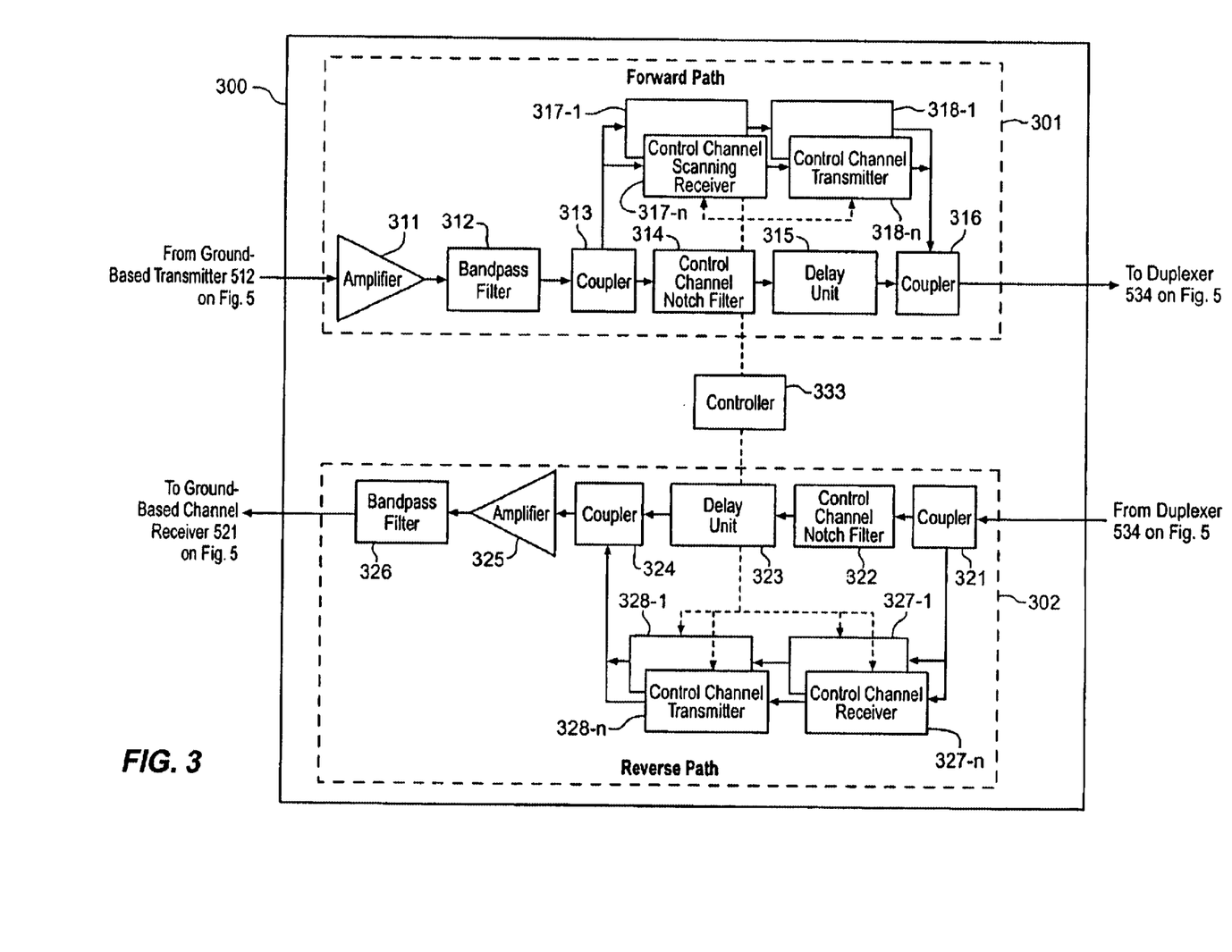
FIG. 3 illustrates, in block diagram form, the architecture of a typical embodiment of the signal translating repeater of the present invention.

As illustrated in FIG. 3, the present signal translating repeater 500 can include an optional control channel management component 300 that is a combination of a signal repeater and a frequency translator, termed "ReLator" herein. The non-terrestrial cell sites can further avoid interference by transmitting control signals in non-terrestrial control channels (such as selected ones of channels 709–729) to the aircraft. The ReLator, located on board the aircraft, captures these transmitted frequency translated cell site cellular communications forward path control signals and rebroadcasts these forward path control signals in the aircraft to the subscribers' ground-based mobile subscriber stations via an in-cabin antenna system on ground-based control channels, such as selected ones of channels 326–346. The rebroadcast signals comprise channel translated signals using standard analog forward path control channels. The ReLator receives standard ground-based reverse path control signals on ground-based control channels, such as selected ones of channels 326–346, from the ground-based mobile subscriber stations located on the aircraft and retransmits these reverse path control signals to the non-terrestrial cell site on frequency translated cell site cellular communications control channels, such as selected ones of channels 709–729. Voice channels are selected to be in the same place in the band for both the cell site and ground-based cellular, and are simply amplified and retransmitted without frequency translation.

In order to eliminate the possibility of inadvertently receiving signals that are transmitted from the cell site on a ground-based control channel, the ReLator notches out the range of ground-based control channels (channels 313–354) from the received signals in the path that retransmits the voice channels, as described below. Thus, the ground-based mobile subscriber stations, located in the aircraft, only receive control signals on ground-based control channels which control signals comprise control signals that are frequency shifted from the received frequency translated cell site cellular control channels. In the reverse direction, the ReLator receives the control channel signals transmitted by the ground-based subscriber mobile stations located in the aircraft. The received control channel signals are decoded to ensure that they are valid control channel signals, not spurious signals. In addition, the proximity of the in-aircraft antenna 335 to the ground-based mobile subscriber stations that are located in the aircraft enables the present signal translating repeater to signal the ground-based mobile subscriber stations to reduce their operating power to a minimal level to thereby reduce the possibility of interference.

Signal Translating Repeater Operation

A typical implementation of the control channel management component 300 of the present signal translating repeater 500 is illustrated in FIG. 3. This device consists of a Forward Path Circuit 301 and a Reverse Path Circuit 302 that are located in the signal translating repeater 500, interposed between duplexer 534 and both the ground-based channel transmitter 512 and ground-based channel receiver 521.

The Forward Path Circuit 301 consists of a plurality of forward path control channel receivers 317-1 to 317-n, each of which is connected to a corresponding forward path control channel transmitter 318-1 to 318-n. These receivers and transmitters are connected to and controlled by the signal translating repeater controller 333. The non-terrestrial cell sites transmit signals on ground-based cellular communication channels to the aircraft, but on radio frequencies that are translated from those used by conventional ground-based cellular communication systems as described above with respect to FIG. 5. In addition, the non-terrestrial cell sites transmit signals on non-terrestrial control channels (such as selected ones of channels 709–729) to the aircraft in order to prevent these signals from being received by ground-based mobile subscriber stations. The frequency translated cell site cellular communications signals in the forward direction are received from the ground-based channel transmitter 512 of the signal translating repeater 500 and fed through amplifier 311 to a band-pass filter 312. A coupler 313 then splits these amplified frequency translated cell site cellular communications signals, with one portion being fed through a notch filter 314 to delete any signals that are carried in the ground-based control channels, which are channels 313–354. The resultant notch-filtered signals are fed through a delay element 315 to a coupler 316, where the control signals processed by the forward path control channel receivers 317-1 to 317-n and the forward path control channel transmitters 318-1 to 318-n are translated into the ground-based control channels, which are channels 313–354. The portion of the received amplified frequency translated cell site cellular communications signals that are coupled by the coupler 313 to the forward path control channel receivers 317-1 to 317-n and the forward path control channel transmitters 318-1 to 318-n are processed by these elements to excerpt the control channel content and frequency translate the control channel signals to different associated control channels. Thus, the control signals carried by the frequency translated cell site cellular communications control channels (such as selected ones of channels 709–729) are translated into the ground-based control channels, which are channels 313–354. The frequency translated cell site cellular communications voice channels received from the non-terrestrial cell site are simply forwarded, without frequency translation, to the ground-based mobile subscriber stations. These voice signals are amplified by the amplifier 311.

Furthermore, the signal translating repeater can optionally insert signals into unused ones of the ground-based control channels that serve to block or interfere with the reception of ground-based control signals that are transmitted by a ground-based cell site, such as in the case of a low flying aircraft. This further enables the signal translating repeater to provide service to subscribers in the aircraft without interference from other cellular radio signals that may be present. This is accomplished by the controller 333 activating selected ones of the forward path control channel receivers 317-1 to 317-n and associated forward path control channel transmitters 318-1 to 318-n corresponding to presently unused control channels to insert signals into their control channels that are unusable by the ground-based mobile subscriber stations, but of greater signal magnitude than ambient received ground-based cellular signals. Thus, a noise signal could be used to disable these selected control channels.

The Reverse Path Circuit 302 consists of a plurality of reverse path control channel receivers 327-1 to 327-n, each of which is connected to a corresponding reverse path control channel transmitter 328-1 to 328-n. These receivers and transmitters are connected to and controlled by the signal translating repeater controller 333. The ground-based mobile subscriber stations transmit control signals on ground-based control channels (such as selected ones of channels 313–354) in the aircraft pursuant to the normal operation of the ground-based cellular communication system. The ground-based cellular signals in the reverse direction are received by the antenna 535, fed through the duplexer 534 to the coupler 321, which splits the ground-based cellular signals, with one portion being fed through a notch filter 322 to delete any signals that are carried in the ground-based control channels (such as selected ones of channels 313–354). The resultant notch-filtered signals are fed through a delay element 323 to a coupler 324, where the control signals processed by the reverse path control channel receivers 327-1 to 327-n and the reverse path control channel transmitters 328-1 to 328-n are translated into the frequency translated cell site cellular communications control channels, such as selected ones of channels 709–729. The portion of the received amplified ground-based cellular signals that are coupled by the coupler 321 to the reverse path control channel receivers 327-1 to 327-n and the reverse path control channel transmitters 328-1 to 328-n are processed by these elements to excerpt the control channel content and frequency translate the control channel signals to different associated control channels. Thus, the control signals carried by the ground-based control channels, which are channels 313–354, are translated into the frequency translated cell site cellular communications control channels (such as selected ones of channels 709–729). These control signals inserted into the frequency translated cell site cellular communications control channels and the ground-based voice channels received from the ground-based mobile subscriber stations are amplified by amplifier 325 and processed through band-pass filter 326 to ground-based channel receiver 521 for transmission to the non-terrestrial cell site.

SUMMARY

The present signal translating repeater is located in an aircraft and provides service to mobile subscriber stations that are located in the aircraft, using the ground-based cellular communication paradigm. The present signal translating repeater converts these ground-based cellular communication signals into signals pursuant to the non-terrestrial cellular telecommunication format and transmits these signals to the non-terrestrial cell site(s) presently serving the aircraft.

What is claimed:

1. Cellular radio communication apparatus operable to provide communication services to ground-based cellular mobile subscriber stations that are located in an aircraft, comprising:

means for receiving frequency translated cell site cellular signals, comprising cellular radio frequency communication signals from a cell site in a mode compatible with cellular communications and at predetermined radio frequencies not used for ground-based cellular communications;

means for receiving ground-based cellular signals comprising radio frequency communication signals from ground-based cellular mobile subscriber stations located in said aircraft and in a mode compatible with ground-based cellular communications;

channel frequency translation means for exchanging signals from channels on said received ground-based cellular signals to channels on said frequency translated call site cellular signals and from channels on said received frequency translated cell site cellular signals to channels on ground-based cellular control channels;

means for transmitting said received frequency translated cell site cellular signals translated to channels on ground-based cellular control channels, to said ground-based cellular mobile subscriber stations that are located in said aircraft; and moans for transmitting said received ground-based cellular signals translated to channels on said frequency translated cell site cellular signals, to said cell site.

2. The cellular radio communication apparatus of claim 1 wherein said channel frequency translation means comprises:

means for demodulating said frequency translated cell site cellular signals received from said cell site to obtain signals carried on said channels in said frequency translated cell site cellular signals.

3. The cellular radio communication apparatus of claim 2 wherein said channel frequency translation means further comprises:

radio frequency transmitter means for modulating said signals carried on said channels in said received frequency translated cell site cellular signals into corresponding channels on said ground-based cellular signals.

4. The cellular radio communication apparatus of claim 1 wherein said channel frequency translation means comprises:

means for demodulating said ground-based cellular signals received from said ground-based cellular mobile subscriber stations located in said aircraft to obtain signals carried an said channels in said ground-based cellular signals.

5. The cellular radio communication apparatus of claim 4 wherein said channel frequency translation means further comprises:

radio frequency transmitter means for modulating said signals carried on said channels in said ground-based cellular signals into corresponding channels on said frequency translated cell site cellular signals.

6. The cellular radio communication apparatus of claim 1 further comprising:

means for exchanging control signals from control channels on said received ground-based cellular signals to control channels on said frequency translated cell site cellular signals and from control channels on said received frequency translated cell site cellular signals to control channels on said ground-based cellular signals.

7. The cellular radio communication apparatus of claim 6 further comprising:
notch filter means, responsive to said received ground-based cellular signals, for deleting signals contained in channels of said received ground-based cellular signals that correspond to ground-basednon-terrestrial cellular control channels.

8. The cellular radio communication apparatus of claim 7 further comprising:
coupler means, responsive to said received ground-based cellular signals having signals deleted there from that correspond to ground-basednon-terrestrial cellular control channels, for inserting said control signals, exchanged from control channels on said received ground-based cellular signals to control channels on non-terrestrial cellular signals.

9. The cellular radio communication apparatus of claim 6 further comprising:
notch filter means, responsive to said received frequency translated cell site cellular signals, for deleting signals contained in channels of said received frequency translated cell site cellular signals that correspond to ground-based cellular control channels.

10. The cellular radio communication apparatus of claim 9 further comprising:
coupler means, responsive to said received frequency translated cell site cellular signals, having signals deleted there from that correspond to ground-based cellular control channels, for inserting said control signals, exchanged from control channels on said received frequency translated cell site cellular signals into control channels on ground-based cellular signals.

11. The cellular radio communication apparatus of claim 9 further comprising:
means for inserting signals into selected ones of said channels of said received frequency translated cell site cellular signals that correspond to ground-based cellular control channels to disable use of said selected channels.

12. The cellular radio communication apparatus of claim 1 further comprising:
means for disabling operation of digital cellular mobile subscriber stations that are located in said aircraft.

13. The cellular radio communication apparatus of claim 1 further comprising:
power management means for regulating operation of said ground-based cellular mobile subscriber stations to a minimal power level to avoid Interference.

14. The cellular radio communication apparatus of claim 1 further comprising:
notch filter means, responsive to said received frequency translated cell site cellular signals, for deleting signals contained in channels of said received frequency translated cell site cellular signals that correspond to ground-based cellular control channels.

15. A method of operating a cellular radio communication apparatus operable to provide communication services to ground-based cellular mobile subscriber stations that are located in an aircraft, comprising:
receiving frequency translated cell site cellular signals, comprising cellular radio frequency communication signals from a cell site in a mode compatible with cellular communications and at predetermined radio frequencies not used for ground-based cellular communications;
receiving ground-based cellular signals comprising radio frequency communication signals from ground-based cellular mobile subscriber stations located in said aircraft and in a mode compatible with ground-based cellular communications;
channel frequency translation to exchange signals from channels on said received ground-based cellular signals to channels on said frequency translated cell site cellular signals and from channels on said received frequency translated cell site cellular signals to channels on ground-based cellular control channels;
transmitting said received frequency translated cell site cellular signals translated to channels on ground-based cellular control channels, to said ground-based cellular mobile subscriber stations that are located in said aircraft; and
transmitting said received ground-based cellular signals translated to channels on said frequency translated cell site cellular signals, to said cell site.

16. The method of operating a cellular radio communication apparatus of claim 15 wherein said step of channel frequency translation comprises:
demodulating said frequency translated cell site cellular signals received from said cell site to obtain signals carried on said channels in said frequency translated cell site cellular signals.

17. The method of operating a cellular radio communication apparatus of claim 16 wherein said step of channel frequency translation further comprises:
modulating said signals carried on said channels in said received frequency translated cell site cellular signals into corresponding channels on said ground-based cellular signals.

18. The method of operating a cellular radio communication apparatus of claim 15 wherein said step of channel frequency translation comprises:
demodulating said ground-based cellular signals received from said ground-based cellular mobile subscriber stations located in said aircraft to obtain signals carried on said channels in said ground-based cellular signals.

19. The method of operating a cellular radio communication apparatus of claim 18 wherein said step of channel frequency translation further comprises:
modulating said signals carried on said channels in said ground-based cellular signals into corresponding channels on said frequency translated cell site cellular signals.

20. The method of operating a cellular radio communication apparatus of claim 15 further comprising:
exchanging control signals from control channels on said received ground-based cellular signals to control channels on said frequency translated cell site cellular signals and from control channels on said received frequency translated cell site cellular signals to control channels on said ground-based cellular signals.

21. The method of operating a cellular radio communication apparatus of claim 20 further comprising:
deleting, in response to said received frequency translated cell site cellular signals, signals contained in channels of said received frequency translated cell site cellular signals that correspond to ground-based cellular control channels.

22. The method of operating a cellular radio communication apparatus of claim 21 further comprising:

inserting, in response to said received frequency translated cell site cellular signals, having signals deleted there from that correspond to ground-based cellular control channels, said control signals, exchanged from control channels on said received frequency translated cell site cellular signals, into control channels on ground-based cellular signals.

23. The method of operating a cellular radio communication apparatus of claim 21 further comprising:

inserting signals into selected ones of said channels of said received frequency translated cell site cellular signals that correspond to ground-based cellular control channels to disable use of said selected channels.

24. The method of operating a cellular radio communication apparatus of claim 20 further comprising;

deleting, in response to said received ground-based cellular signals, signals contained in channels of said received ground-based cellular signals that correspond to ground-basednon-terrestrial cellular control channels.

25. The method of operating a cellular radio communication apparatus of claim 24 further comprising:

inserting, in response to said received ground-based cellular signals having signals deleted there from that correspond to ground-basednon-terrestrial cellular control channels, said control signals, exchanged from control channels on said received ground-based cellular signals, to control channels on non-terrestrial cellular signals.

26. The method of operating a cellular radio communication apparatus of claim 15 further comprising:

disabling operation of digital cellular mobile subscriber stations that are located in said aircraft.

27. The method of operating a cellular radio communication apparatus of claim 15 further comprising:

regulating operation of said ground-based cellular mobile subscriber stations to a minimal power level to avoid interference.

28. The method of operating a cellular radio communication apparatus of claim 15 further comprising:

deleting, in response to said received frequency translated cell site cellular signals, signals contained In channels of said received frequency translated cell site cellular signals that correspond to ground-based cellular control channels.

\* \* \* \* \*